United States Patent
Cathers et al.

[15] 3,666,211
[45] May 30, 1972

[54] TRIJET AIRCRAFT

[72] Inventors: Richard T. Cathers, Fullerton; William M. Douglass, Palos Verdes Estates; Frederick D. Hess, Jr., Lakewood; John Morris, Newport Beach; James E. Roberts, Long Beach, all of Calif.

[73] Assignee: McDonnell Douglas Corporation, Santa Monica, Calif.

[22] Filed: Mar. 12, 1970

[21] Appl. No.: 18,960

[52] U.S. Cl..............................244/54, 244/55, 244/120, 248/5
[51] Int. Cl................................................B64d 27/20
[58] Field of Search..................244/54, 55, 53, 120, 124; 71/1; 248/5

[56] References Cited

UNITED STATES PATENTS

| | | | |
|---|---|---|---|
| D214,597 | 7/1969 | Cathers et al. | 71/1 |
| 2,944,766 | 7/1960 | Freeding et al. | 244/54 |
| 3,188,025 | 6/1965 | Moorehead | 244/55 |
| 3,194,515 | 7/1965 | Cohan | 244/120 |

OTHER PUBLICATIONS

"Douglas Proposes Two Versions of Airbus" – Aviation Week & Space Technology– June 26, 1967– p. 26– 29
Flight International, March 13, 1969 p. 407– 416

Primary Examiner—Milton Buchler
Assistant Examiner—Steven W. Weinrieb
Attorney—Walter J. Jason, Donald L. Royer and Robert O. Richardson

[57] ABSTRACT

An aircraft having a pair of wing mounted jet engines and an aft engine of the high-bypass turbofan type mounted in the vertical stabilizer of the tail section. The aft engine has a straight air inlet duct passing through vertical stabilizer spars attached directly to fuselage bulkheads. Each spar is a ring frame of a one-piece forging. A pylon beam extending aft from the base of the vertical stabilizer provides a top engine interface similar to that on the wing.

19 Claims, 13 Drawing Figures

PATENTED MAY 30 1972
3,666,211
SHEET 1 OF 3
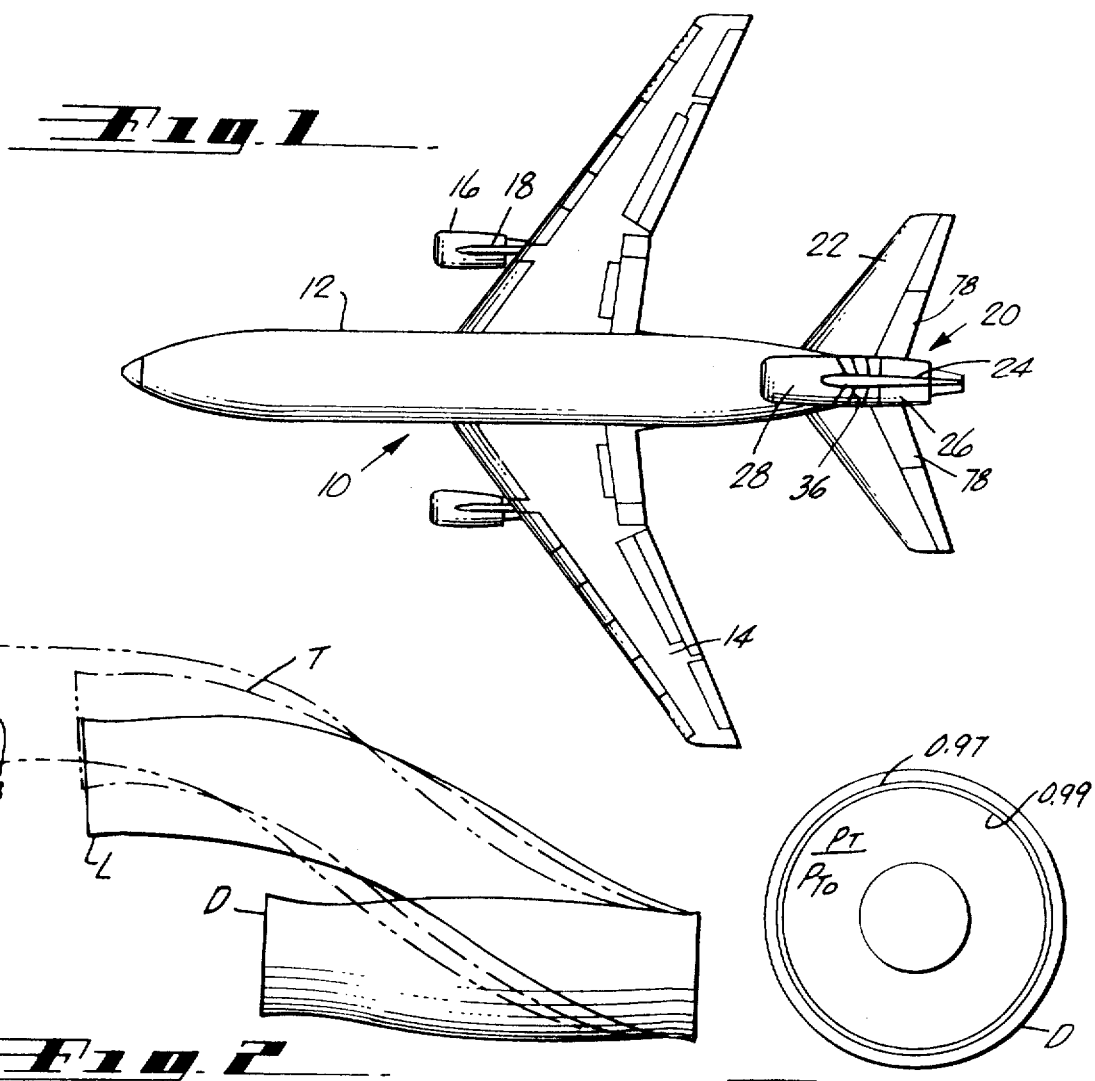
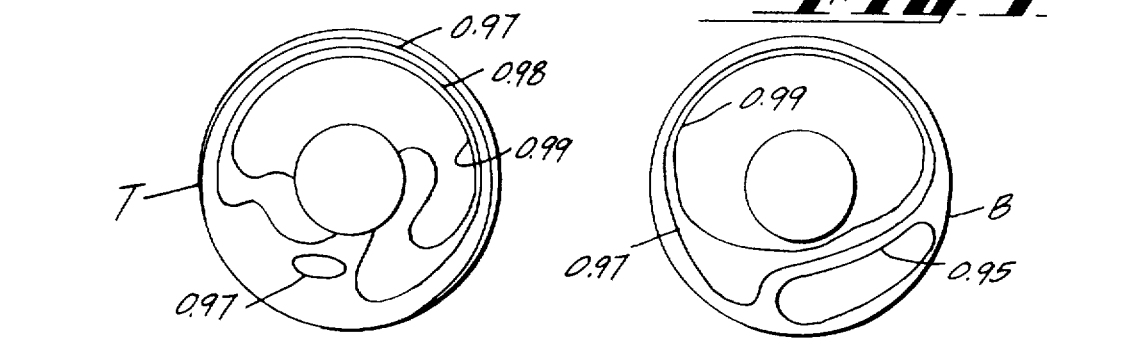
INVENTORS
RICHARD T. CATHERS
WILLIAM M. DOUGLASS
FREDERICK D. HESS, JR.
JOHN MORRIS
JAMES E. ROBERTS
By Robert O. Richardson
— ATTORNEY —

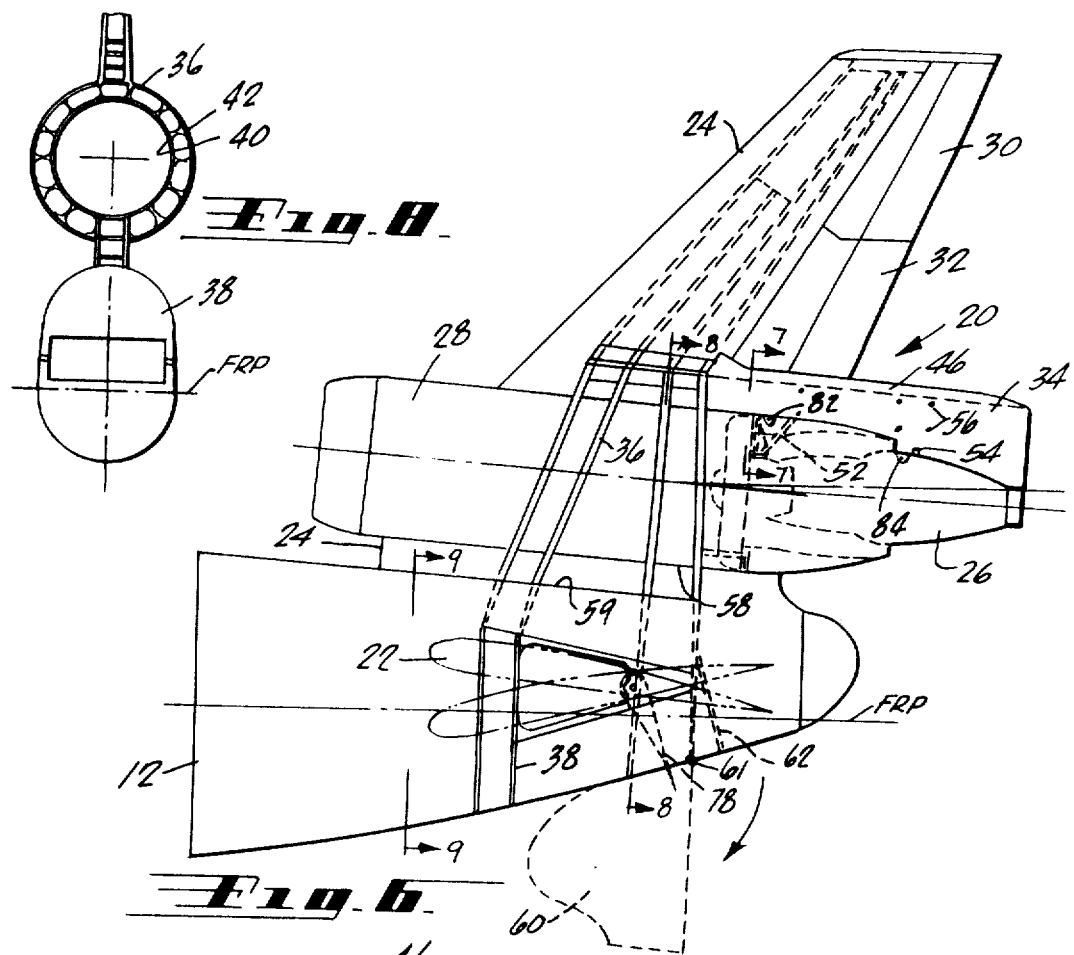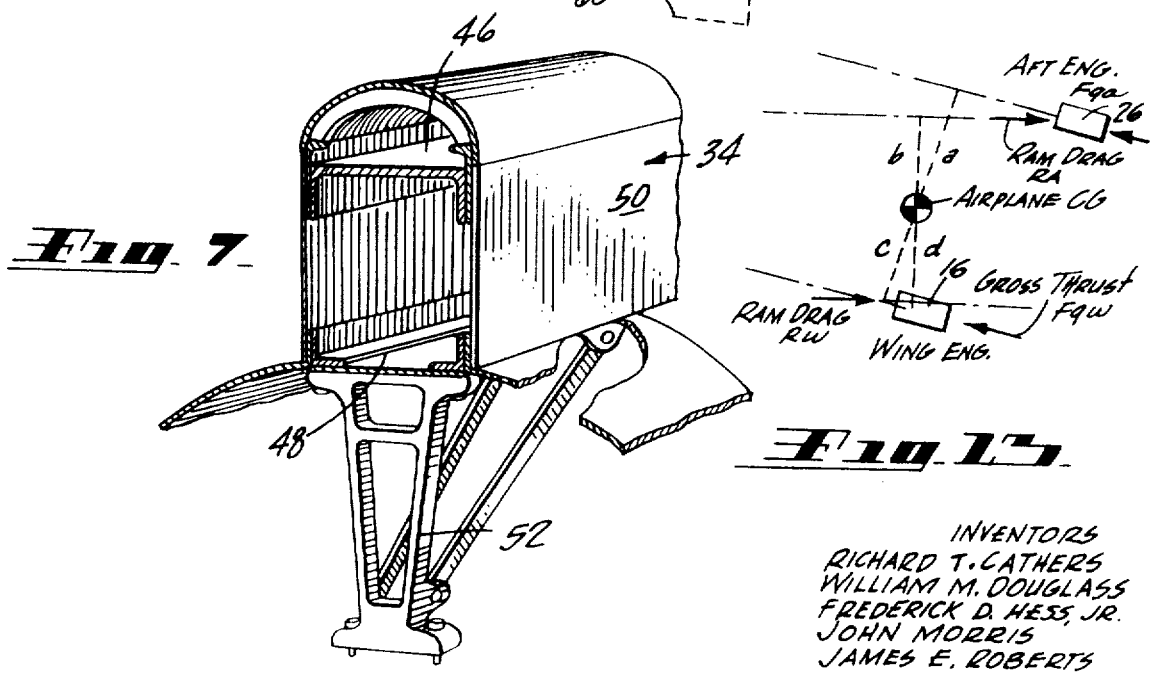

INVENTORS
RICHARD T. CATHERS
WILLIAM M. DOUGLASS
FREDERICK D. HESS, JR.
JOHN MORRIS
JAMES E. ROBERTS

By Robert O. Richardson
-Attorney-

TRIJET AIRCRAFT

BACKGROUND OF THE INVENTION

Airplanes are built to meet the specific needs of their users. One U.S. domestic airlines requirement is for a large-capacity medium-range aircraft. Originally it was desired that the aircraft carrying a full load transcontinental with one fuel stop also have a good airfield performance in terms of noise, maneuverability, takeoff and landing distance requirements, climb and landing slopes, etc. Large capacity aircraft with twin engines and a 300-seat capacity were first studied. However, a later survey revealed the need for an aircraft with coast-to-coast non-stop capabilities without sacrifice of shorter-range economics, and it was felt that the only satisfactory way such a range could be achieved was by the use of three engines.

A new generation of high bypass turbofan engines with improved power-weight ratio and a significant reduction in fuel consumption has provided airframe designers with the challenge of designing a single airframe adaptable to carry a full load off 6,000 ft. runways for short ranges and the same load off 10,000 ft. runways for distances in excess of 3,000 miles. One basic type of aircraft with this versatility can do a very large share of the world's air transportation.

Having selected a trijet aircraft as the one best suited to the foregoing requirements, one of the features of the present invention is the proper placement of the engines. Two engines on one side and one on the other, either on the wings or on the fuselage, lacked symmetry. Three engines on the tail is the configuration of an existing commercially acceptable aircraft. However, for proper balance, the wings must be placed more rearwardly than if two of the engines were on the wings. Also, the tail surfaces must be made larger to compensate for the shorter tail distance to the center of balance of the aircraft. The larger tail size adds weight and drag, making operational costs higher. A saving of over 4 tons of weight can be achieved simply by mounting two engines on the wing and one in the tail for better total mass distribution, instead of having all three engines far aft on the fuselage.

Engine-in-the-tail configurations include the aft pod inlet, bifurcated inlet, engine forward of vertical stabilizer, S-duct inlet and now the straight inlet. Several contemporary commercial aircraft have the S-duct inlet with the inlet above the fuselage curving down to join the engine mounted rearwardly on the fuselage. Weight, drag, inlet loss and flow distortion, inlet-engine compatibility, susceptibility to engine-disk failure, engine growth, commonality with the wing-mounted engines, and reverser effectiveness were considered for each configuration. The straight inlet through the vertical stabilizer concept of the present invention proved to be the best.

SUMMARY OF THE PRESENT INVENTION

The trijet aircraft comprising the present invention has two high bypass turbofan jet engines on the wings and a similar third engine in the tail, providing a more balanced weight distribution and a longer tail arm, resulting in smaller tail surfaces with a saving of weight and decrease in drag. The aft engine is equivalent to the wing engine installation in performance, operational characteristics and installation features.

The aft engine is suspended from a pylon engine support beam extending rearwardly from four single piece forged spars continuing around the inlet duct as ring frames and forming the main structure of the vertical stabilizer. These spars continue into the fuselage and attach directly to bulkheads. The pylon beam provides a top engine mount interface identical to that at the wing location and permits many of the services from the engine to the aircraft to be identical to the wing-mounted installation. The cowl doors and thrust reverser are arranged identically to those on the wing engine, thus providing the same degree of accessibility for engine servicing. Hinged engine access doors and reverser halves are attached to aircraft structure and are not part of the demountable power plant. This minimizes the size of the demountable power plant to within the maximum permissable shipping width of 8 feet.

Normal servicing (such as engine oil replenishment) is accomplished from within the tailcone. The lower section of the fuselage tailcone below the engine may be reached from a common step ladder, and an integral ladder allows entry into the tailcone. In the event a component failure requires access to the engine accessory section, upper tailcone doors and fan cowl doors may be opened. Components of the power plant may then be readily serviced or replaced from the work platform built into the fuselage tailcone. Doors in the platform permit lowering of accessories directly down through the tailcone. For engine removal and replacement, the aircraft tailcone is hinged to swing downward and provide a clear path for direct lowering of the engine. The inner rearwardly extending elevators of the horizontal stabilizer also drop down to be out of the way of the engine. The demountable power-plant assembly can then be removed by a simple hoisting action, the hoist being mountable to the pylon beam.

BRIEF DESCRIPTION OF THE DRAWINGS

FIG. 1 is a plan view of the aircraft showing the relationship of the wing, engines and tail;

FIG. 2 is a schematic illustration of several S-bend inlet ducts to the rear engine;

FIGS. 3, 4 and 5 are schematic representations of inlet distortion when the various ducts are used;

FIG. 6 is a schematic view in elevation of the tail section of the aircraft;

FIG. 7 is a fragmentary perspective view looking rearwardly along the line 7—7 in FIG. 6;

FIG. 8 is a cross-sectional view of a ring frame taken along the line 8—8 of FIG. 6;

FIG. 13 is a graphic representation of the thrust vectors relative to the aircraft center of gravity.

DETAILED DESCRIPTION OF ILLUSTRATIVE EMBODIMENT

Figure 10:
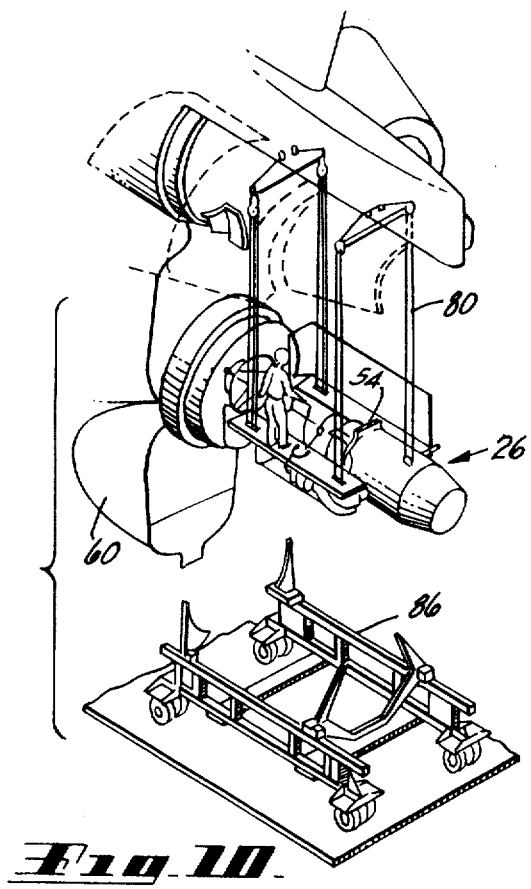
FIG. 10 is a schematic view in perspective showing one method of lowering the engine using the beam support.

Reference is now made to FIG. 1 which shows an illustrative aircraft 10 having a fuselage 12, swept wings 14 with turbofan engines 16 mounted thereon through pylons 18. The tail section 20 includes horizontal stabilizer 22 and vertical stabilizer 24 with a third engine 26 mounted therein. A straight through inlet duct 28 extends forwardly of the vertical stabilizer 24. Other views may be seen in U.S. Pat. No. D. 214,597 issuing July 1, 1969 and having a common assignee. This aircraft has a cruising spectrum of M 0.82 normal for range up to M 0.86 normal for high speed, with M 0.88 as a possible maximum. The resulting conventional wing has a 35° one-fourth-chord-sweepback and aspect ratio of 6.8. Its thickness is 11.5 percent of the root chord and 10 percent of the tip. The aircraft has an initial cruise altitude of at least 32,000 ft. at M 0.85 and of around 35,000 ft. at M 0.82.

Normal longitudinal control is by conventional elevator with an adjustable tailplane for trimming. Because of the high position of engine 26, the rudder is double-hinged for a more efficient shape and, hence, effectiveness for the limited overall height available. Rudder lower sections only are used for auto yaw damping.

This aircraft typically is about 180 ft. long with a wing span of about 155 ft. The tip of the vertical stabilizer 24 is about 55 ft. high and the base of the aft engine 26 is about 25 ft. high. Its gross weight is about 410,000 pounds and its three engines each have a 40,000 lb-thrust. The aft engine 26 has the same interface fittings and substantially the same performance as the wing engines 16 and is interchangeable with them.

The foregoing aircraft is set forth by way of example only in utilizing the principles of the present invention and is to be understood that the same principles may be used in aircraft dissimilar in mission and performance.

Because of the straight through inlet duct 28 no special thrust-setting curves are needed for engine 26 as are needed for the engines having "S" ducts such as those shown in FIG. 2. Three S-ducts B, T and L, on three commercially available aircraft may be compared with the straight through duct D of the present invention, which is about 100 pounds lighter in weight than the S-ducts. Duct D of the present invention has a front opening of a given diameter for best cruise conditions. This diameter contracts rearwardly to form a throat portion to assure attached flow at static or low speed conditions and then expands further rearwardly in a diffuser portion to reduce airflow velocity and thence the magnitude of the skin friction loss. The inner diameter then contracts slightly at the rear of the duct to mate with the engine opening.

S-duct inlets for aft-engine installation must be longer than a straight inlet because of the offset. The areas of those shown are 50 to 80 percent greater than that of the straight inlet of equal diameter. The consequent greater surface area produces a proportionate increase in total-head loss. These losses must be even larger because of the greater velocities required to accelerate the flow through the S-duct. The flow distortion of S-ducts may require special thrust-setting curves for The engine, have lead to a performance penalty through inlet flow distortion, shown engine sensitivity to crosswinds, imposed compressor bleed restrictions, and give rise to slower acceleration. In contrast, the aft engine requirements in the present invention call for performance equivalent to the wing engines in terms of thrust, low drag, high recovery, distortion-free flow and minimum noise. Its operational characteristics are equivalent to wing engines in terms of acceleration, common settings, sub-system compatibility and crosswind capability. Only the straight through duct of the present invention will permit this. As will be seen hereinafter, the engine installation is common to the wing engines.

The S-duct curvature accelerates the flow locally, causing increased velocities and dynamic pressures which result in increased total-head loss. The loss of the straight inlet occurs at the fan periphery and only influences the fan performance whereas the loss of an S-duct is distributed throughout the fan and gas generator flows. A loss in the flow that enters the gas generator has an adverse effect on the engine thermal efficiency. The engine performance change due to a loss in total pressure is therefore more penalizing for the S-duct inlet than for the straight through duct.

Because of its effect on engine operation, total pressure distortion is one of the major factors favoring the straight inlet duct of the present invention. Distortion reduces engine life, increases engine noise, and reduces the engine compressor stall margin. The inlet distortion for S-ducts T, B and D are shown in FIGS. 3, 4 and 5 respectively, data on the distortion of S-duct L being presently unavailable but is thought to resemble that of duct T. The pressure lines show the relationship of total pressure to a standard sea level static pressure in order to illustrate the inlet distortion. The straight inlet in FIG. 5 has a uniform peripheral boundary layer due only to skin friction and, therefore, has low distortion. The S-duct inlets of FIGS. 3 and 4 have higher distortion with areas of low total-pressure air as may be seen by the total pressure profiles.

Reference is now made to the tail section 20 in FIG. 6. The vertical tail consists of a fixed vertical stabilizer 24 containing a straight-engine inlet duct 28, an upper and lower rudder 30, 32, and the aft engine pylon or cantilevered beam 34. In the attachment of the vertical stabilizer 24 to the fuselage 12, upstanding spars 36 continue into the fuselage 12 and attach directly to bulkheads 38. The major structure of the vertical stabilizer 24 consists of four fail-safe spars 36 continuing around the inlet duct 28 as ring frames. The inlet duct skin is attached to the inner cap of the ring frame, and the stabilizer skin panels are shear-clipped to this duct skin above and below the duct. As a result, the duct skin is also the stabilizer load shear path. The spars 36 are one-piece aluminum forgings which give good material properties in the direction of the major loads and permit efficient use of material by reducing the number of parts and joints. An aluminum alloy known as 7075-T73 having superior stress-corrosion resistance is preferred. The one-piece design eliminates joints associated with fatigue problems and results in an overall weight reduction. Canting of the fuselage bulkheads 38 to accommodate a shear type splice for the spar attachment avoids the usual tension splice at the fuselage juncture.

To permit ease of access, the outer surface of the inlet duct 28 is covered with removable panels and hinged doors. This arrangement affords complete access to the structure and systems.

An additional advantage of this configuration is the inherent protection afforded the engine against damage caused by high-angle rotation during takeoff. This is important for the growth versions which will develop from the basic aircraft as it is made larger.

The straight engine inlet duct 28 through the vertical stabilizer is a simple duct structure, yet has inherently good flow distortion characteristics and has been sized to accommodate all anticipated airflow growth for future larger engines. The inner and outer contours 40, 42 of the inlet are cylindrical through the forward three spars, as shown in FIG. 8, thus allowing single curvature skins in this area. The inner duct skin ring is stiffened and joined through the shear panels to the stabilizer skin panels above and below the duct. In this manner the inner duct structure is utilized as the stabilizer shear material. In the region of the spars 36, the outer panels are attached by screws and are hinged for access to the rudder control and engine systems and for assembly and inspection of the structure. This arrangement provides unobstructed access between spars for both structure and systems. The outer panels are of honeycomb sandwich construction for simplicity, minimum weight and stiffness. Forward of the stabilizer spars, the inlet structure consists of zee-stiffened shells attached to a full-depth frame just ahead of the vertical stabilizer front spar.

Crosswind capability has been achieved by locating the inlet 28 forward of the vertical tail 24 one inlet diameter in length (about 12 feet) and using a conservative lip thickness and diffuser angle. This inlet has a tolerance to crosswind comparable to that of the wing engines and will operate in crosswinds up to 60 knots without exceeding the engine's distortion limits. The weight and complexity of blow-in doors are avoided by this design. The problem was considerably simplified since the straight duct does not develop additional adverse pressure gradients within the duct.

The inlet 28 is located about 26 inches above the fuselage 12 so that fuselage boundary layer of about 19 inches will not enter the inlet. Fuselage growth by as much as 50 feet in length has been provided in the selected vertical location.

The tail pylon 34 is located aft of the rear spar 36 of the vertical stabilizer 24, above the engine 26, and below the rudder 32. The pylon beam 34 extends aft from the base of the vertical stabilizer and connected to the spars 36 and provides a top engine mount interface identical to the wing engine installation. This permits many of the services from the engine to the aircraft to be identical to the wing-mounted installation. The pylon structure is designed by stiffness requirements to meet all flutter conditions and, therefore, has low working stresses. As shown in FIG. 7, the pylon 34 is a box beam consisting of a forged aluminum alloy upper spar 46, a built-up titanium lower spar 48, and aluminum alloy side skin panels 50 of stiffened skin design. The side skins provide fail-safe strength in case of failure of an upper spar cap. Doors in the side skins allow access for structural and systems inspection. A truss 52 transmits forward engine mount loads into the pylon box and a transverse bulkhead transmits the aft engine mount loads from retaining bolts 54 which connect the rear of the engine to the pylon 34. A ground support equipment extension of this beam may be fastened to it at bolt holes 56.

The vertical location of the aft engine 26 above the airplane center of gravity produces pitching moments due to aft engine thrust that counteract those of the wing engines 16 (shown in FIG. 1) resulting in a very small change in trim with increased engine power during climb. This can be seen by the graphic representation in FIG. 13. Here there is shown the center of gravity CG which is near the fuselage floor. The aft engine 26 is above it and the two wing engines 16 are below it. The gross thrust from the aft engine ($Fg_A$) is lever arm length a from CG and follows the direction of the axis of the engine exit nozzle. In this case a is the height of the aft engine above the CG plus the inclination of the axis of its exit nozzle or 18 + feet. Opposing this thrust is the ram drag ($R_A$) or entering momentum as the face of the engine moves through the air. The moment arm of the aft engine ram drag is of length $b$. Similarly, the moment arm of length $c$ (about 10 feet) positions the gross thrust vector ($Fg_W$) of each wing engine 16. The entering momentum or ram drag ($R_W$) on each engine has a moment arm of d. The moments acting on the aircraft as a result of the engines is as follows: $aFg_A - bR_A \approx n (cF_{gw} - dR_W)$ where $n$ is the number of engines below the CG. Thus the height of the aft engine above the CG may be expected to be about twice that of the distance of the wing engines below it. The axis of the aft engine 26 is tilted 2 ½° above the fuselage reference plane which extends along the axis of the fuselage. The axis of the inlet duct 28, however, is tilted 4° so that its lower surface 58 is parallel with the upper surface 59 of the fuselage to avoid airflow problems.

Figure 11:
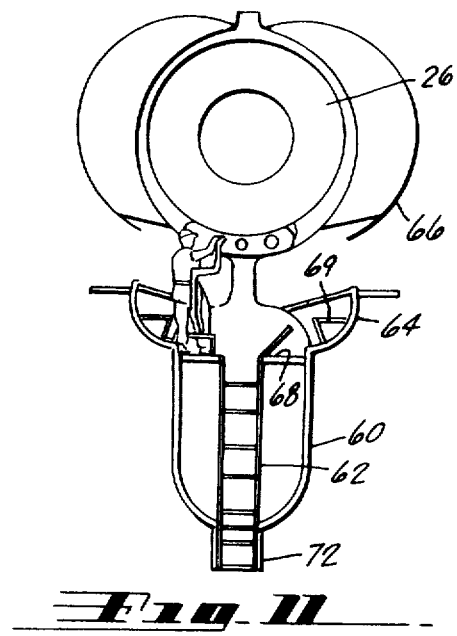
FIG. 11 is a schematic view showing a workman on the work platform in the tailcone performing minor maintenance.
Figure 9:
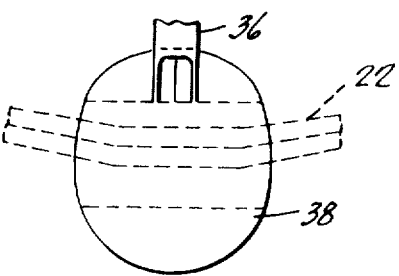
FIG. 9 is a cross-sectional view of the fuselage looking rearwardly from line 9—9.

The design of the aft engine installation has been particularly influenced by the need to provide convenient means for accomplishing both scheduled and unscheduled maintenance. The configuration shown in FIG. 11 provides builtin access to the aft engine 26 at a line station without the need for ground support equipment. With this arrangement, the lower section of the fuselage tailcone 60 below the engine 26 is reached from a common step ladder, and an integral ladder 62 allows entry into the tailcone 60. Normal servicing (such as engine oil replenishment) is accomplished from within the tailcone.

In the event that a component failure requires access to the engine accessory section, the upper tailcone doors 64 and fan cowl doors 66 are opened. All dispatch-critical power-plant components can then be readily serviced or replaced from the work platform 68 built into the fuselage tailcone. Steps 69 inside doors 64 are also provided.

Access hatch doors 70 in the platform 68 and 72 in the tailcone are arranged to permit lowering accessories directly down through the tailcone 60. The heaviest accessory requiring replacement for dispatch is the engine starter, weighing approximately 40 pounds.

Engine removal and replacement also has been an important consideration in the design of the aft engine 26 configuration. Hinging the engine cowling sections 74 and fan reverser halves 76 from the pylon 34 has significantly contributed to this design by eliminating these components from the demountable power-plant assembly. As shown in FIGS. 6 and 10, the aircraft tailcone 60 is hinged at 61 to swing downward and provide a clear path for direct lowering of the engine 26. The inner elevators 78 of the horizontal stabilizer 22 also drop down out of the way.

Figure 12:
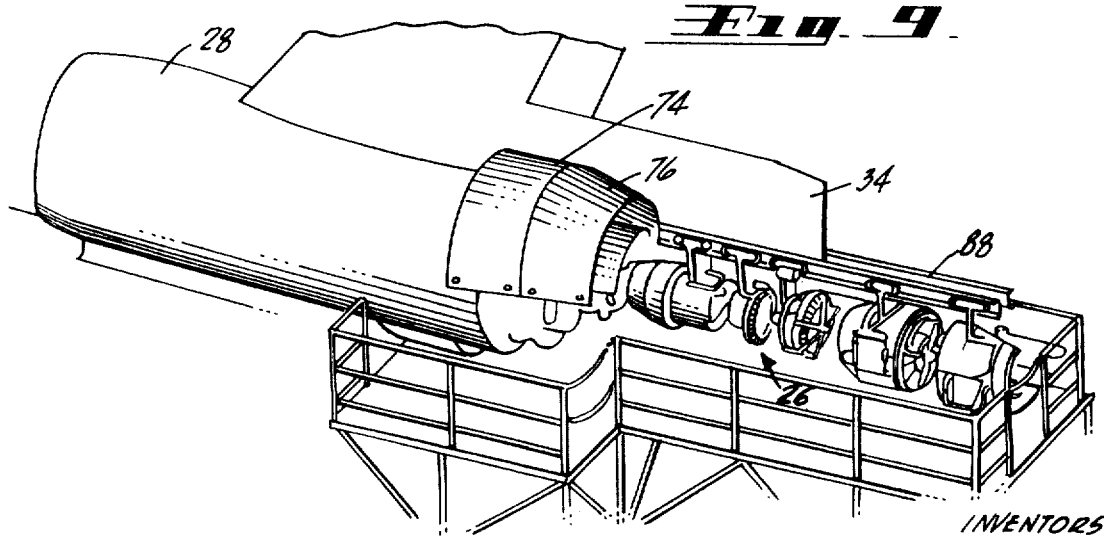
FIG. 12 is a schematic view showing a support rail extended from the beam to support elements of the motor in partial disassembly.

The demountable power-plant assembly 44 can then be removed by a simple hoisting action. Shown in FIG. 10 is a concept using a bootstrap hoist 80 that is intended for use at a field station where limited ground support equipment is available. This hoist may be fastened at points 82, 84 to the pylon 34 shown in FIG. 6 and directly lower the engine onto the carriage 86 below. Also, as shown in FIG. 12 an extension 88 may be added to pylon 34 at bolt holes 56 shown in FIG. 6 for holding dissassembled parts of the engine 26 for servicing or replacement.

Having thus described an illustrative embodiment of the present invention, it is to be understood that other embodiments will occur to those skilled in the art and that these modifications are to be construed as part of the present invention.

We claim:

1. In an aircraft having a fuselage, a wing attached to the fuselage, a vertical stabilizer attached to the fuselage in the aft portion thereof, the vertical stabilizer including a fixed vertical fin and a movable rudder, a horizontal stabilizer attached to the fuselage in the aft portion thereof and at least one aircraft engine, the improvement comprising:

a cantilever beam fixedly attached to said fixed vertical fin and extending rearwardly therefrom, said cantilever beam being positioned in spaced relationship to said fuselage, said cantilever beam including means for detachably mounting said aircraft engine thereto;

said engine being positioned below said cantilever beam, the axis of rotation of said engine being in general alignment with the plane of said vertical fin;

said vertical fin including a generally straight line engine inlet duct extending therethrough from substantially forward thereof to said engine;

said engine being located downstream of the inlet to said inlet duct.

2. The aircraft defined in claim 1 wherein said engine inlet duct is substantially circular in cross-section about an axis therealong;

the axis of said engine inlet duct being in approximate alignment with the axis of rotation of said engine.

3. The aircraft defined in claim 1 wherein said vertical fin includes at least one structural member having upper and lower end portions and an annular portion therebetween;

said annular portion defining an opening in said structural member through which is positioned said engine inlet duct;

said lower portion of said structural member being attached to the aft portion of the fuselage; and said upper portion of said structural member being attached to said cantilever beam.

4. The aircraft defined in claim 1 wherein said vertical fin includes a plurality of structural members each having upper and lower end portions and an annular portion therebetween;

said lower portions of said structural members being attached to the aft portion of the fuselage and said upper portions of said structural members being attached to said cantilever beam to form a truss structure between said fuselage and said cantilever beam.

5. The aircraft defined in claim 4 wherein said structural members are one piece forgings and said annular portions of said structural members formed into said truss structure define an opening through said truss structure through which is positioned said engine inlet duct;

said annular portions of said structural members being shaped to project a generally circular cross-section perpendicular to the axis of said engine inlet duct.

6. In an aircraft having a fuselage, a wing attached to the fuselage, a vertical stabilizer attached to the fuselage in the aft portion thereof, the vertical stabilizer including a fixed vertical fin and a movable rudder, a horizontal stabilizer attached to the fuselage in the aft portion thereof and at least one thrust producing device, the improvement comprising:

a cantilever beam fixedly attached to said fixed vertical fin and extending rearwardly therefrom, said cantilever beam being positioned in spaced relationship to said fuselage, said cantilever beam including means for detachably mounting the thrust producing device thereto;

said thrust producing device being a turbine engine positioned below said cantilever beam;

the aft portion of said fuselage including a tail cone portion located at least in part below said turbine engine; and pivotal means connecting said tail cone to the fuselage in a manner to allow said tail cone to be swung forward of said turbine engine.

7. The aircraft defined in claim 6 wherein the horizontal stabilizer includes an elevator portion which extends in part adjacent said tail cone portion and below said turbine engine; and means for pivoting said elevator portion forward of said turbine engine.

8. The aircraft defined in claim 6 wherein said cantilever beam includes:

turbine engine hoist attachment points, said turbine engine also including hoist attachment points;

whereby said turbine engine may be removed from said aircraft by pivoting said tail cone forward, by detaching said turbine engine from said cantilever beam and by lowering said engine vertically from said cantilever beam through the use of the respective hoist attachment points.

9. In an aircraft having a fuselage, a wing attached to the fuselage, a vertical stabilizer attached to the fuselage in the aft portion thereof, the vertical stabilizer including a fixed vertical fin and a movable rudder, a horizontal stabilizer attached to the fuselage in the aft portion thereof and at least one thrust producing device, the improvement comprising:

a cantilever beam fixedly attached to said fixed vertical fin and extending rearwardly therefrom, said cantilever beam being positioned in spaced relationship to said fuselage, said cantilever beam including means for detachably mounting the thrust producing device thereto;

said thrust producing device being a turbine engine positioned below said cantilever beam, the aft portion of said fuselage including:

a hollow tail cone portion located at least in part below said turbine engine, said hollow tail cone portion having a body portion;

at least one panel forming an upper portion of said tail cone, said panel being pivotally mounted to said tail cone body portion so that the upper portion of said tail cone can be opened; and a horizontal platform fixedly attached within said tail cone body portion adjacent said pivoted panel, said platform being in spaced relationship to said turbine engine to permit a workman to stand on said platform while working on said engine.

10. The aircraft defined in claim 9 wherein said tail cone panel includes a step fixedly attached to the inner surface thereof, said step being connected thereinto so that said step is spaced a predetermined distance from said turbine engine when said panel is pivoted to open the upper portion of said tail cone to permit a workman to stand on said step while working on said engine.

11. The aircraft defined in claim 9 wherein said hollow tail cone includes:

an access hatch in the bottom portion thereof; and said horizontal platform includes an access hatch therein, whereby said access hatches allow access through said tail cone to said turbine engine when said tail cone panel is pivoted to open the upper portion of said tail cone.

12. In an aircraft having a fuselage, a wing attached to the fuselage, a vertical stabilizer attached to the fuselage in the aft portion thereof, the vertical stabilizer including a fixed vertical fin and a movable rudder, a horizontal stabilizer attached to the fuselage in the aft portion thereof and at least one aircraft engine, the improvement comprising:

a cantilever beam fixedly attached to said fixed vertical fin and extending rearwardly therefrom, said cantilever beam being positioned in spaced relationship to said fuselage, said cantilever beam including means for detachably mounting said aircraft engine thereto;

said engine being positioned below said cantilever beam, the axis of rotation of said engine being in general alignment with the plane of said vertical fin;

said vertical fin including a generally straight line engine inlet duct extending therethrough from substantially forward thereof to said engine;

said engine being located downstream of the inlet to said inlet duct;

cantilever beam extension means detachably mounted to said cantilever beam and extending rearwardly therefrom;

said cantilever beam extension means being adapted to allow disassembled portions of said engine to be hung therefrom to allow maintenance work to be performed on the disassembled portions.

13. An aircraft having at least three thrust producing devices, a fuselage, a wing, and a vertical tail member wherein:

at least one of said thrust producing devices is mounted in predetermined spaced relationship to said fuselage in said vertical tail member;

said vertical tail member including straight through duct means for directing air to said thrust producing device mounted in said vertical tail member;

said duct means having an inlet extending forwardly of said vertical tail member.

14. The aircraft defined in claim 13 wherein said aircraft has a center of gravity and a predeterminable line of movement through the air when said aircraft is in aerodynamic flight, said thrust producing devices being jet engines having predeterminable drag characteristics along lines of drag parallel to said line of movement and also having predeterminable thrust characteristics along lines of thrust, said aircraft including:

pylon means connected to said wing, at least two of said jet engines being connected to said aircraft in predetermined spaced relationship below said wing by said pylon means;

said jet engines of said aircraft being spaced in accordance with the formula $aF_{gA} - bR_A \approx n(cF_{gW} - dR_W)$ where:

$a$ equals the vertical perpendicular distance between the line of thrust of said tail mounted jet engine and the aircraft center of gravity, $b$ equals the vertical perpendicular distance between the line of drag of said tail mounted jet engine and the aircraft center of gravity, $c$ equals the vertical perpendicular distance between the lines of thrust of said wing mounted jet engines and the aircraft center of gravity, $d$ equals the vertical perpendicular distance between the lines of drag of said wing mounted jet engines and the aircraft center of gravity, $F_{gA}$ equals the gross thrust of said tail mounted jet engine, $F_{gW}$ equals the gross thrust of one of said wing mounted jet engines, $R_A$ equals the drag of said tail mounted jet engine, $R_W$ equals the drag of one of said wing mounted jet engines, and $n$ equals the number of wing mounted jet engines.

15. The aircraft defined in claim 13 wherein said fuselage includes a center portion whose cross-section is substantially circular about an axis;

said thrust producing device being mounted in said vertical tail member having a predetermined line of thrust;

said line of thrust being aligned with said vertical tail member and at a predetermined angle to the axis of said center portion of said fuselage so that said line of thrust and said axis intersect behind said fuselage.

16. The aircraft defined in claim 15 wherein said straight through means for directing air to said vertical tail member include a duct defining portion of substantially circular cross-section about an axis therealong, said duct being orientated at a predetermined angle with respect to said fuselage center portion axis so the axis of the duct intersects the axis of the fuselage center portion at a point between the aft end of the fuselage and the intersection between the line of thrust of said vertical tail member mounted thrust producing device and the axis of the fuselage center portion.

17. The aircraft defined in claim 13 wherein said straight through means for directing air to said thrust producing device include a duct of generally circular cross-section:

said duct includes front, throat, diffuser and rear portions;

said front duct portion defining an opening of a predetermined diameter;

said throat portion defining an opening of a diameter less than said front duct portion opening diameter;

said diffuser duct portion defining an opening of an enlarged diameter to reduce airflow velocity and skin friction losses;

said rear portion being of a diameter to mate with the front of said thrust producing device.

18. The aircraft defined in claim 13 wherein said vertical tail member includes a rearwardly extending structural beam to which said vertical tail member mounted thrust producing device is attached; and an aerodynamic fairing covering said structural beam and extending downwardly and rearwardly therefrom to adjacent the upper side of said vertical tail member mounted thrust producing device.

19. The aircraft defined in claim 13 wherein said thrust producing devices are jet engines;

said vertical tail member including a rearwardly extending beam member fixedly attached thereto;

first mounting means including control and supply connection means detachably connecting said vertical tail member mounted jet engine to said beam member;

said vertical tail member mounted jet engine being adapted to mate with said first mounting means; and pylon means connected to said wings;

said pylon means including second and third mounting means including control and supply connection means detachably connecting said other two jet engines to said wing;

said jet engines being substantially identical and said first, second and third mounting means being substantially identical whereby any of the jet engines may be interchanged to any of the three mounting means of the aircraft.

* * * * *